(12) United States Patent
Gutowski et al.

(10) Patent No.: US 11,897,313 B2
(45) Date of Patent: Feb. 13, 2024

(54) ENHANCED VEHICLE WINDOW ANTI-FOGGING STRATEGY

(71) Applicant: FORD GLOBAL TECHNOLOGIES, LLC, Dearborn, MI (US)

(72) Inventors: Alan Gutowski, Wixom, MI (US); Manfred Koberstein, Troy, MI (US); William Stewart Johnston, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 17/371,853

(22) Filed: Jul. 9, 2021

(65) Prior Publication Data

US 2021/0339604 A1   Nov. 4, 2021

Related U.S. Application Data

(63) Continuation-in-part of application No. 15/813,695, filed on Nov. 15, 2017, now Pat. No. 11,267,314.

(51) Int. Cl.
*B60H 1/00* (2006.01)
*B60H 1/32* (2006.01)

(52) U.S. Cl.
CPC ..... *B60H 1/00785* (2013.01); *B60H 1/00828* (2013.01); *B60H 1/3207* (2013.01); *B60H 1/00849* (2013.01); *B60H 1/00885* (2013.01)

(58) Field of Classification Search
CPC .............. B60H 1/3207; B60H 1/00785; B60H 1/00892; B60H 1/00807; B60H 1/00828
See application file for complete search history.

(56) References Cited

U.S. PATENT DOCUMENTS 4,408,660 A * 10/1983 Sutoh ................. B60H 1/00785
165/223
4,602,675 A * 7/1986 Kobayashi ......... G05D 23/1917
165/204

(Continued)

FOREIGN PATENT DOCUMENTS

CN       102205782 A       10/2011
CN       102991440 A        3/2013

(Continued)

OTHER PUBLICATIONS

U.S. Appl. No. 60/678,000 A, filed May 30, 2000, Dage, Gerhard Allan.

(Continued)

*Primary Examiner* — Jianying C Atkisson
*Assistant Examiner* — For K Ling
(74) *Attorney, Agent, or Firm* — Vichit Chea; Price Heneveld LLP

(57) ABSTRACT

A method for defogging a window of a vehicle includes steps of automatically selecting a climate control system operating mode and determining a risk of window fogging. The climate control system operating mode is selected from an outside air mode, an air-conditioning mode, and a defrost mode. A controller determines the risk of window fogging according to one or more inputs, and the same or a different controller may automatically select the climate control system operating mode. The controller is configured to increase a climate control system blower speed to increase a rate of airflow provided by the currently-actuated climate control system operating mode. The controller may sequentially advance the climate control system operating mode through the outside air mode, air-conditioning mode, and defrost mode.

7 Claims, 6 Drawing Sheets

(56) References Cited

U.S. PATENT DOCUMENTS

| | | | | |
|---|---|---|---|---|
| 4,867,561 | A * | 9/1989 | Fujii | B60S 1/0822 |
| | | | | 250/341.7 |
| 5,516,041 | A * | 5/1996 | Davis, Jr. | B60H 1/00814 |
| | | | | 236/44 C |
| 6,067,808 | A * | 5/2000 | Dage | B60H 1/3207 |
| | | | | 454/75 |
| 6,508,408 | B2 * | 1/2003 | Kelly | B60H 1/00785 |
| | | | | 236/44 C |
| 7,337,622 | B2 | 3/2008 | Wang et al. | |
| 2003/0140642 | A1 * | 7/2003 | Quilliard | B60H 1/00864 |
| | | | | 62/186 |
| 2006/0000597 | A1 | 1/2006 | Errington et al. | |
| 2006/0118290 | A1 * | 6/2006 | Klassen | B60H 1/00828 |
| | | | | 165/202 |
| 2008/0173437 | A1 | 7/2008 | Yelles | |
| 2008/0183334 | A1 * | 7/2008 | Greiner | B60H 1/00964 |
| | | | | 454/75 |
| 2014/0157803 | A1 * | 6/2014 | Pebley | B60H 1/00778 |
| | | | | 62/89 |
| 2014/0318159 | A1 * | 10/2014 | Eisenhour | B60H 1/3211 |
| | | | | 62/89 |
| 2016/0052366 | A1 | 2/2016 | Hoke et al. | |

FOREIGN PATENT DOCUMENTS

| | | | | |
|---|---|---|---|---|
| CN | 203810650 U | | 9/2014 | |
| EP | 1112871 B1 | | 9/2003 | |
| JP | 57155114 A | * | 9/1982 | B60H 1/00785 |
| JP | 57155114 A | | 9/1982 | |
| JP | 2002178885 A | | 6/2002 | |

OTHER PUBLICATIONS

English Machine Translation of JP2002178885A.
English Machine Translation of CN102205782A.
English Machine Translation of CN102991440A.
English Machine Translation of CN203810650U.
English Machine Translation of EP1112871.

* cited by examiner

| Table A | | \multicolumn{6}{c}{Relative Humidity - %} | | | | | |
|---|---|---|---|---|---|---|---|
| | | 50 | 60 | 70 | 80 | 90 | 100 |
| Outside Amb Temp | -20 | 0 | 0 | 0 | 0 | 50 | 100 |
| | -10 | 0 | 0 | 0 | 0 | 50 | 100 |
| | 0 | 0 | 0 | 25 | 50 | 75 | 100 |
| | 10 | 0 | 0 | 25 | 50 | 75 | 100 |
| | 20 | 0 | 0 | 25 | 50 | 75 | 100 |
| | 30 | 0 | 0 | 25 | 50 | 75 | 100 |
| | 40 | 0 | 0 | 25 | 50 | 75 | 100 |

| Table B | | Blower Speed - Volts | | | | | |
|---|---|---|---|---|---|---|---|
| | | 0 | 4 | 6 | 8 | 10 | 12 |
| HVAC Mode Distribution | Defrost | 0 | 10 | 5 | 0 | 0 | 0 |
| | Def/Fl | 0 | 15 | 10 | 5 | 0 | 0 |
| | Fl | 0 | 20 | 15 | 10 | 5 | 0 |
| | PF | 0 | 10 | 5 | 0 | 0 | 0 |
| | Pnl | 0 | 0 | 0 | 0 | 0 | 0 |

| Table C | Number of Occupant | | | | | |
|---|---|---|---|---|---|---|
| | 1 | 2 | 3 | 4 | 5 | 6 |
| | 0 | 5 | 10 | 15 | 20 | 25 |

| Table D | Wiper Status | |
|---|---|---|
| | 0 | 1 |
| | 0 | 15 |

| Table E | Htd Ws Status | |
|---|---|---|
| | 0 | 1 |
| | 0 | 15 |

| Table F | Htd Rr Glass Status | |
|---|---|---|
| | 0 | 1 |
| | 0 | 15 |

FIG. 5

ENHANCED VEHICLE WINDOW ANTI-FOGGING STRATEGY

This application is a continuation-in-part of U.S. patent application Ser. No. 15/813,695 filed on 15 Nov. 2017, now U.S. Pat. No. 11,267,314, the full disclosure of which is incorporated herein by reference.

TECHNICAL FIELD

This disclosure relates generally to vehicle heating, ventilation, and air conditioning (HVAC) system operation. More particularly, the disclosure relates to strategies for activating suitable defogging/defrosting systems according to determined conditions, while maintaining suitable comfort levels for vehicle occupants.

BACKGROUND

A vehicle includes many systems and devices which are devoted to maintaining passenger comfort. For example, modern automotive heating, ventilation, and air-conditioning (HVAC) systems are highly advanced, and include various manually and automatically operated features whose fundamental purpose is to preserve and enhance passenger comfort. Some modern vehicles include automated passenger comfort-related systems relying on sensor-driven coordination of actuation of the vehicle heating and/or cooling systems according to a variety of inputs such as ambient temperature, ambient humidity, passenger cabin temperature, passenger cabin humidity, sun load, and others.

Certain other vehicle systems are not typically designed with passenger comfort in mind. For example, multiple systems and strategies are known in the vehicle industry for preventing or eliminating vehicle window fogging/frosting. Some such systems are designed to anticipate and so prevent fogging/frosting, such as by using algorithms to determine a risk of window fogging/frosting and activating one or more window defog/defrost systems if such a risk is ascertained. Typically, these systems/strategies rely on simply directing a suitably heated and/or dehumidified airflow against the window to prevent or clear fogging/frosting. While effective for their intended purpose, conventional systems and strategies emphasize window defogging without any consideration of passenger comfort, since the priority is window defogging to provide an unimpeded view of the road. As an example, manual or automatic actuation of a window defogging system may direct a blast of dehumidified and/or heated air against a window that effectively clears any fog or frost therefrom. However, because the dehumidified and/or heated airflow is generated regardless of any consideration of ambient temperature/humidity, passenger cabin temperature/humidity, etc., passenger cabin occupant comfort may be negatively impacted.

To solve this and other problems, the present disclosure relates at a high level to systems and methods for vehicle window defogging which select a vehicle climate control system defogging strategy according to determined conditions, and/or which incrementally apply various vehicle climate control system defogging strategies and systems as necessary according to determined conditions and/or as conditions change. The systems and methods rely on various vehicle sensor and user-implemented inputs in determining a risk of window fogging created by particular conditions. By such incremental application of strategies/systems, a necessary level of vehicle window defogging is applied while preserving conditions providing a desired level of vehicle occupant comfort to the extent possible.

SUMMARY

In accordance with the purposes and benefits described herein, in one aspect of the disclosure a method for defogging a window of a vehicle is provided, comprising by a controller according to one or more sensor inputs, automatically selecting a climate control system operating mode according to a predetermined required passenger comfort level from one of an outside air mode, an air-conditioning mode, and a defrost mode. The controller then determines an imminent risk or actual occurrence of window fogging by the controller or a different controller according to one or more user inputs provided by actuating one or more of a window wiper system, a heated windshield system, and a heated backlight system. The controller or a different controller then increases a climate control system blower speed to increase an airflow provided by the automatically selected climate control system operating mode and directs or redirects the increased airflow against one or more vehicle windows. The controller may actuate an airflow regulating door system to direct or redirect the airflow. The one or more sensor inputs may be provided to the controller from one or more of a windscreen relative humidity sensor, a vehicle-associated exterior ambient temperature sensor, and a passenger cabin temperature sensor. The controller or the different controller may comprise one or more processors associated with a vehicle climate control module (CCM).

In embodiments, the controller or the different controller periodically redetermines the imminent risk or actual occurrence of window fogging and transitions the climate control system operating mode sequentially through the outside air mode, the air-conditioning mode, and the defrost mode. In this embodiment, intervening steps are provided of, by the controller or the different controller according to the redetermined imminent risk or actual occurrence of window fogging, increasing the climate control system blower speed to increase a rate of airflow and directing or redirecting the airflow against the one or more vehicle windows.

In another aspect, a method for defogging a window of a vehicle is provided comprising, during or after a cold engine lock-out phase of operation of a vehicle heating, ventilation, and air-conditioning (HVAC) system, by a processor comprised in a vehicle climate control module (CCM) receiving a first user input provided by actuating one or more of a windshield wiper system, a heated windshield system, and a heated backlight system and interpreting that first user input as an indicator of imminent or actual window fogging and increasing an HVAC blower speed to increase airflow and directing or redirecting the airflow against one or more vehicle windows. The method further comprises, during a subsequent automatic HVAC mode determination phase, by the processor or the another processor receiving one or more sensor inputs, automatically selecting an HVAC operating mode according to a predetermined required passenger comfort level from one of an outside air mode, an air-conditioning mode, and a defrost mode, and;

by the processor or the another processor, receiving a second user input provided by actuating one or more of the windshield wiper system, the heated windshield system, and the heated backlight system, receiving a second user input provided by actuating one or more of the windshield wiper system, the heated windshield system, and the heated backlight system, and by the processor or the another processor, interpreting the second user input as an indicator of imminent or actual window fogging and in response increasing the HVAC blower speed to increase airflow provided by the automatically selected HVAC operating mode and directing or redirecting the airflow against the one or more vehicle windows.

In embodiments, the processor or the different processor may directly select a one of the outside air mode, the air-conditioning mode, and the defrost mode according to the determined risk of window fogging, or may actuate the outside air mode, the air-conditioning mode, and the defrost mode sequentially. Intervening steps of increasing a climate control system blower speed to increase a rate of airflow provided by one or more of the outside air mode, the air-conditioning mode, and the defrost mode may be provided, implemented by the processor or the different processor. The inputs may be provided to the processor by the group of sensors consisting of a windscreen relative humidity sensor, a vehicle-associated exterior ambient temperature sensor, and a passenger cabin temperature sensor, or by occupant-provided inputs selected from actuating a window wiper system and/or a window heated glass system such as a windshield heater, a heated backlight, and others. The processor or the different processor may actuate an airflow regulating door system to direct or redirect the airflow. The one or more sensor inputs to the processor may be provided by one or more of a windscreen relative humidity sensor, a vehicle-associated exterior ambient temperature sensor, and a passenger cabin temperature sensor.

In embodiments the method includes, by the processor or the different processor, redetermining the imminent risk or actual occurrence of window fogging and transitioning the HVAC operating mode sequentially through the outside air mode, the air-conditioning mode, and the defrost mode according to the redetermined risk of window fogging. The method further includes providing intervening steps of, by the processor or the different processor according to the redetermined imminent risk or actual occurrence of window fogging, increasing the HVAC blower speed to increase airflow and directing or redirecting the airflow against the one or more vehicle windows.

In yet another aspect, a window defogging system for a vehicle is provided, comprising one or more processors comprised in a vehicle climate control module (CCM) and configured to determine a risk of window fogging according to one or more measured inputs, one or more sensors adapted to send the one or more measured inputs to the one or more processors, and a climate control system operatively connected to the one or more processors. The one or more processors are further configured to automatically select a climate control system operating mode according to a predetermined required vehicle occupant comfort level and further to determine an imminent risk or actual occurrence of window fogging on receipt of a user-provided input provided by actuating one or more of a window wiper system, a heated windshield system, and a heated backlight system, to increase a climate control system blower speed, and to direct or redirect an airflow against one or more vehicle windows. The system may include an airflow regulating door system to direct or redirect the airflow. The one or more sensors may be selected from the group consisting of a windscreen relative humidity sensor, a vehicle-associated exterior ambient temperature sensor, and a passenger cabin temperature sensor.

In embodiments, the one or more processors are configured to automatically select the climate control system operating mode from one of an outside air mode, an air-conditioning mode, and a defrost mode. In embodiments, the one or more processors are configured to redetermine the imminent risk or actual occurrence of window fogging and to transition the climate control system operating mode through the outside air mode, the air-conditioning mode, and the defrost mode according to the redetermined imminent risk or actual occurrence of window fogging. The one or more processors may further be configured to, on receipt of the user-provided input, increase the climate control system blower speed to increase a rate of airflow provided by the currently-operating climate control system operating mode before advancing to a next climate control system operating mode.

In the following description, there are shown and described embodiments of the disclosed vehicle window defogging methods and systems. As it should be realized, the systems/methods are capable of other, different embodiments and their several details are capable of modification in various, obvious aspects all without departing from the systems and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed vehicle window defogging methods and systems, and together with the description serve to explain certain principles thereof. In the drawings:

FIG. 5 shows a representative look-up table array for the system of FIG. 4.

Reference will now be made in detail to embodiments of the disclosed vehicle window defogging methods and systems, examples of which are illustrated in the accompanying drawing figures wherein like reference numerals identify like features.

DETAILED DESCRIPTION

Figure 1:
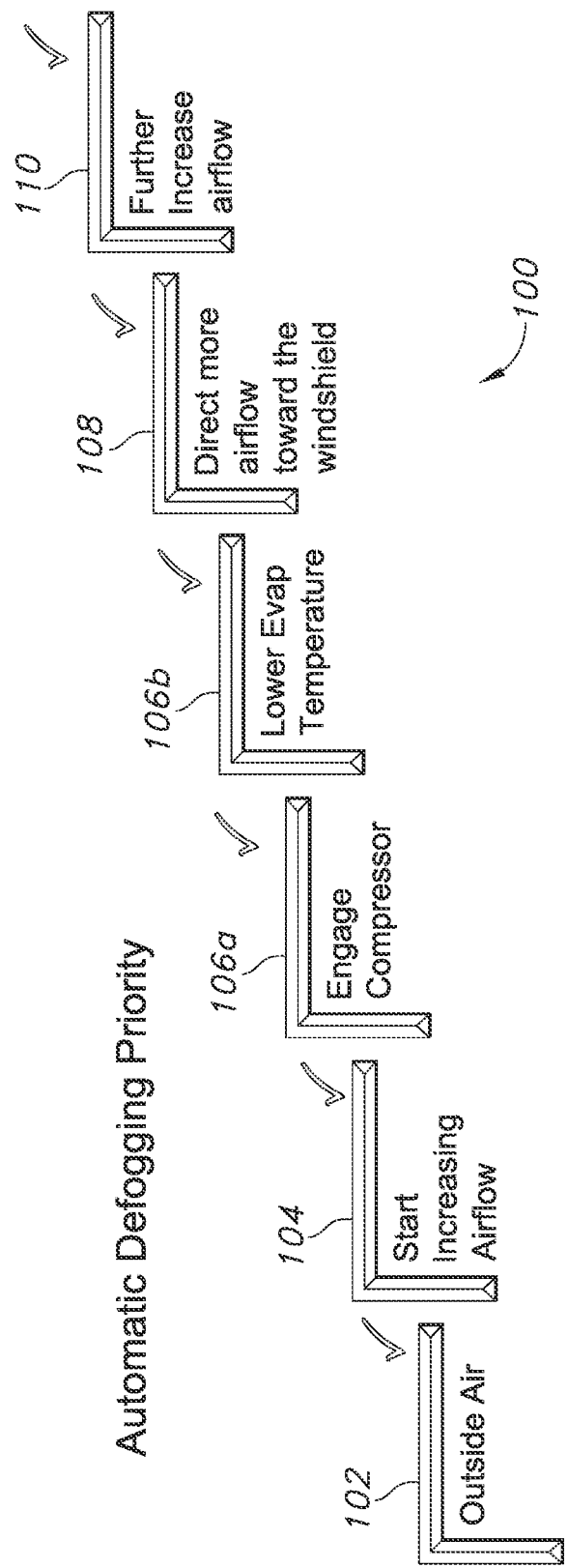
FIG. 1 schematically depicts a method for operating a window defogging system according to the present disclosure.

The present disclosure is directed to methods for systematically responding to a risk of window fogging by incrementally increasing a response provided by a window defogging system, and to vehicle systems configured to implement the described methods. In particular, as shown schematically in FIG. 1, at a high level a method 100 for operating a vehicle window defogging system contemplates a vehicle window defogging system which responds to a determined risk of window fogging by actuating a vehicle climate control system outside air operating mode to introduce an outside air airflow against the window interior (step 102) and by increasing a climate control system blower speed to increase a rate of the outside air airflow (step 104). As will be appreciated, the term "outside air airflow" refers to routing exterior air, i.e. fresh/ambient air, from an exterior of the vehicle to the vehicle passenger cabin by various known systems and devices.

The window defogging system then actuates an air-conditioning (AC) operating mode of the vehicle climate control system air-conditioning operating mode by engaging a vehicle AC compressor (step 106*a*) and lowering an AC evaporator temperature (step 106*b*). As will be appreciated, this causes dehumidification of the outside air airflow initiated in steps 102/104. Finally, the window defogging system actuates a defrost operating mode of the vehicle climate control system engaging a defrost air distribution mode to direct the dehumidified outside air airflow against the window interior (step 108), and by increasing the climate control system blower speed to increase a rate of the dehumidified outside air airflow against the window interior (step 110).

This process may be considered as calculating an Enhanced Windshield Anti-Fogging Strategy (EWAFS) airflow adder to be implemented on top of an existing HVAC setting previously determined automatically for passenger comfort. For example, if the HVAC is set on AUTO, the calculated EWAFS airflow adder will be added to the automatically determined climate control system blower speed. On the other hand, if a user has overridden to a manual climate control system blower setting, the EWAFs airflow adder will not be included.

As will be appreciated, the vehicle window defogging system may proceed sequentially through each of the above-listed steps each time the system is actuated. However, in embodiments the window defogging system may only proceed through the listed steps to the extent necessary to stabilize or decrease the risk of fogging, which in one non-limiting example could be interpreted by the system as humidity values stabilizing or decreasing. So, for example, if introducing the outside air airflow against the window interior (step 102) and increasing the climate control system blower speed to increase the rate of the outside air airflow (step 104) sufficiently stabilizes or decreases the risk of fogging, the window defogging system will not proceed to step 106.

It will also be appreciated that the steps of increasing the climate control system blower speed (steps 104 and 110) may be limited according to blower and/or vehicle specifications. For example, current vehicle software may only allow a maximum blower speed increase of 2 volts in the event of an increased risk of fogging. Of course, the skilled artisan understands that this value is calibratable, and may vary according to vehicle make and model.

Figure 2:
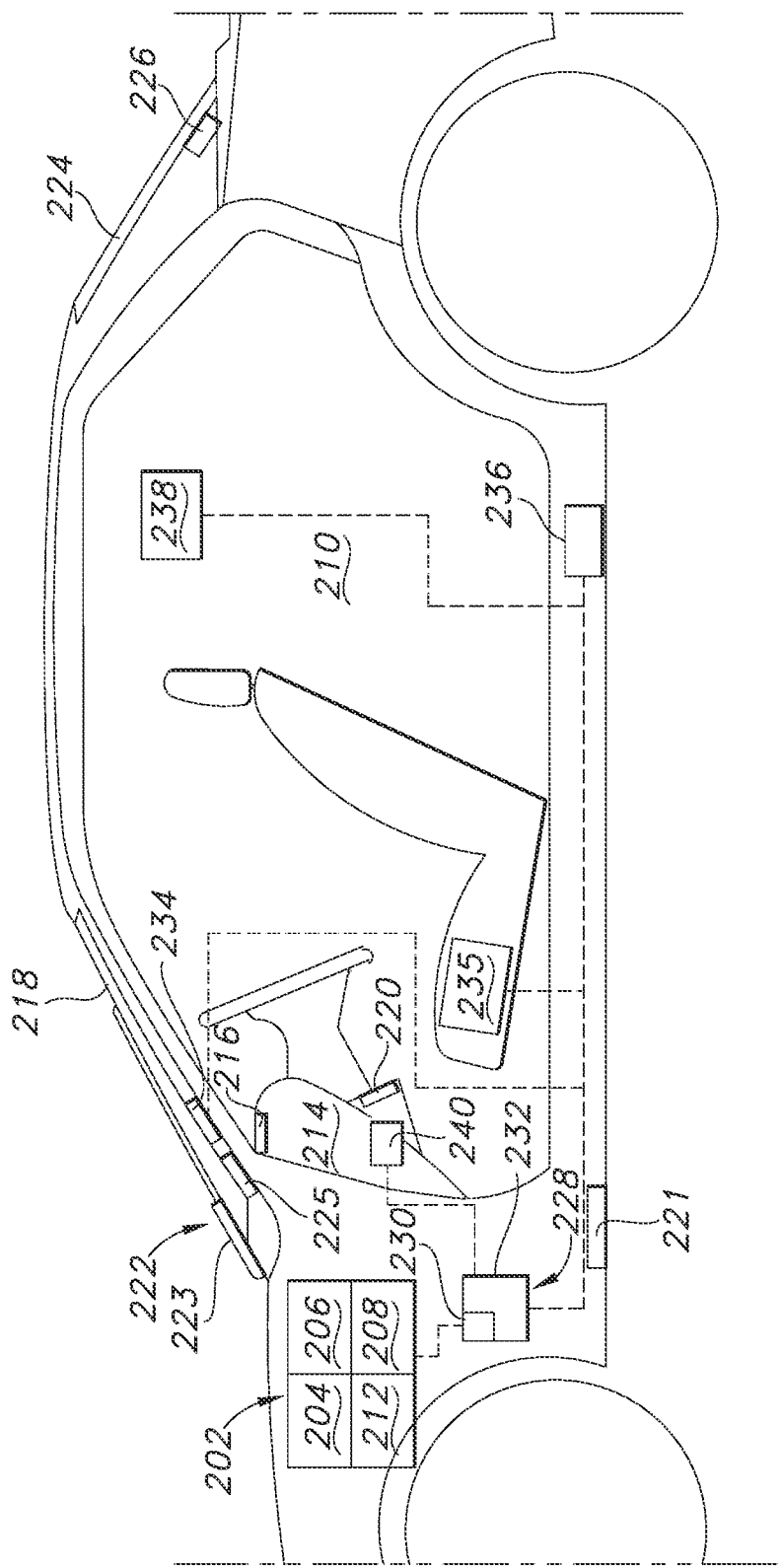
FIG. 2 illustrates a vehicle including a window defogging system for implementing the method of FIG. 1.

FIG. 2 schematically illustrates elements of a representative window defogging system suitable for implementing the method 100. A vehicle 200 includes a climate control system, i.e. HVAC system 202. The elements of a vehicle HVAC system are well-known in the art, and do not require extensive discussion herein, but typically include at least an air-conditioning (AC) system 204 comprising a compressor, a condenser, an expansion valve, and an evaporator. A heating system 206 is also included, comprising at least a heater core. A blower 208 controls a rate of airflow of heated, cooled, and or outside air entering a passenger cabin 210 of the vehicle. An airflow regulating door system 212 comprises a series of doors/valves and actuators controlling the path of airflow of heated, cooled, and or outside air through various HVAC ducts (not shown) and entering the passenger cabin 210 via one or more vents. The vents may include dash panel 214-mounted vents such as a defrost vent 216 oriented to direct airflow against an interior surface of the windshield 218, dash panel-mounted vents 220 oriented to direct airflow towards a passenger cabin 210 occupant, floor vents 221, and others.

The vehicle 200 may further include other systems designed to prevent or remove window fogging/frosting, such as a windshield wiper system 222 including wiper blades 223 and a wiper motor 225. The vehicle 200 may further include a heated backlight (rear window) system 224. As is known, the heated backlight system 224 may include a heat source 226, for example embedded heating elements embedded in the material of the backlight, an infrared heat source for heating the backlight, and others.

A controller 228, which in an embodiment may be one or more processors 230 associated with a climate control module (CCM) 232, is provided in operative communication with the HVAC system 202. The controller 228 is further in communication by wired or wireless means with an array of sensors, each configured to emit inputs which are received by the controller 228. In one possible embodiment, the array of sensors may include one or more of a windshield humidity sensor 234, an ambient (vehicle-exterior) temperature sensor 236, and a passenger cabin temperature sensor 238. Of course, inclusion of other sensors is contemplated, for example vehicle occupancy sensors (not shown in this view but which, as is known, may be as simple as seat-mounted pressure or capacitance switches or as complex as proximity sensors, infrared sensors, camera systems, and others), sun load sensors (not shown) of known design, and others. One or more control panels or actuators 240 may be provided whereby a user may control elements of the HVAC system 202, the windshield wiper system 222, the heated backlight 224, and others. The control panels or actuators 240 may further be in communication with the controller 228, or with a different controller which is in turn in communication with the controller 228.

One or more inputs from the above-described sensors that are indicative of environmental conditions that may be conducive to window fogging are provided to the controller 228, and from those inputs a risk of window fogging is determined. A number of possible methods of and associated algorithms for determining a risk of window fogging by way of a controller 228 are known and are contemplated for use herein. For example, the controller 228/processors 230 may be configured to receive inputs from the windshield humidity sensor 234 and to compare those with a threshold windshield relative humidity level predetermined to pose a risk of window fogging. Alternatively, inputs of multiple measured conditions such as windshield relative humidity, ambient temperature, and passenger cabin temperature provided respectively by the windshield humidity sensor 234, the ambient temperature sensor 236, and the passenger cabin temperature sensor 238 may be received by the controller 228/processors 230. A suitable window fogging risk algorithm may then be applied by the controller 228/processors 230 to determine a risk of window fogging according to the measured conditions. In one possible embodiment, the fogging risk algorithm provided in U.S. Pat. No. 6,155,061 to Ford Motor Company for Method of Determining Windshield Fogging Based on Inference from Presence of Rain, the contents of which are incorporated herein by reference, may be used. Of course, other fogging risk algorithms are known and contemplated for use herein.

Alternatively or additionally, risk of window fogging may be determined by non-sensor inputs provided automatically or according to actions taken by vehicle occupants. For example, use of control panel 240 to actuate the windshield wiper system 222 may be interpreted by the controller 228/processors 230 as an indicator of imminent or actual window fogging. Equally, actuation of a heated windshield mode comprising direction of a heated airflow against an interior surface of windshield 218 via defrost vent 216 may be interpreted by the controller 228/processors 230 as an indicator of imminent or actual window fogging. Likewise, use of control panel 240 to actuate the heated backlight system 224 may be interpreted by the controller 228/processors 230 as an indicator of imminent or actual window fogging.

Figure 3:
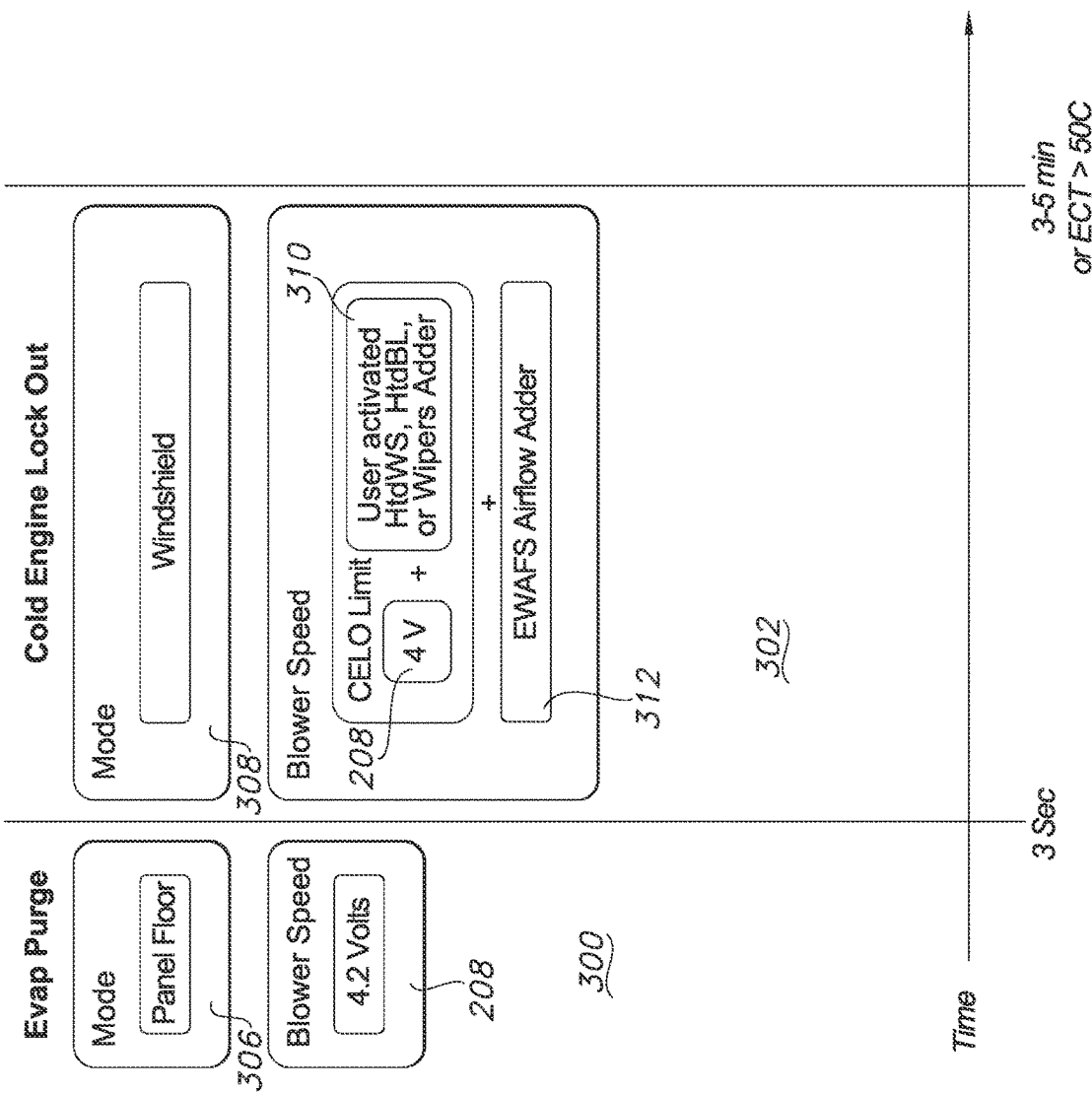
FIG. 3 illustrates various operating modes of a vehicle HVAC system for implementing the method of FIG. 1.
Figure 3:
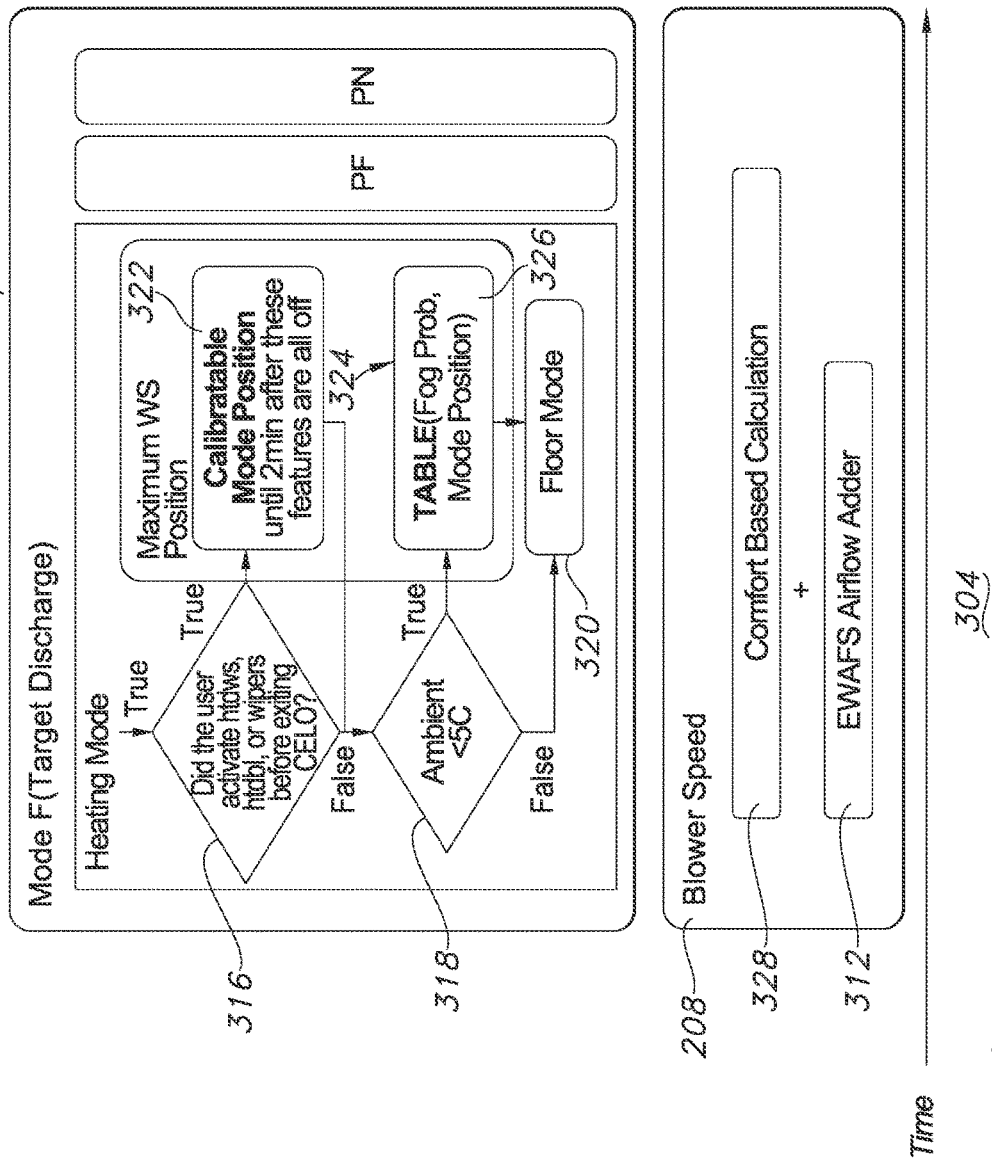

Once a risk of window fogging has been determined by the controller 228/processors 230, the method summarized above and shown in FIG. 1 is implemented. In one possible embodiment it is contemplated to implement the method of FIG. 1 at one or more of various post-startup phases of operation of vehicle 200. In a representative implementation shown in FIG. 3, three phases of operation of an HVAC system 202 as depicted in FIG. 2 are illustrated. These include an evaporator purge phase 300, a cold engine lock-out (CELO) phase 302, and an automatic mode determination phase 304. The phases 300, 302, 304 are shown along an x-axis illustrating a representative timeline for phases 300, 302, 304.

In evaporator purge phase 300, the HVAC system 202 is placed in a floor mode 306 and the blower 208 is operated at an initial speed, in the depicted embodiment being 4.2 volts. This phase is implemented for approximately 3 seconds.

Next, in CELO phase 302 the HVAC system 202 is placed in a windshield mode 308 and the blower 208 is operated at a CELO limited rate of 4 volts. This phase may continue for a predetermined time period, for example 3-5 minutes. Alternatively, the CELO phase 302 may continue until a suitable temperature sensor determines that an engine coolant temperature has reached a predetermined threshold, for example 50° C. If, at this stage, a user-initiated input 310 is detected such as use of control panel 240 to actuate the windshield wiper system 222, to actuate the heated windshield mode as described above, or to actuate the heated backlight system 224, as described above this may be interpreted by the controller 228/processors 230 as an indicator of imminent or actual window fogging. The controller 228/processors 230 then implement the EWAFS airflow adder 312 as described above, and increase the blower 208 speed from the base 4 volts as needed. As noted above, the skilled artisan will appreciate that the blower 208 speed increase may be limited according to blower and/or vehicle specifications. For example, current vehicle software may only allow a maximum blower speed increase of 2 volts in the event of an increased risk of fogging. Of course, the skilled artisan understands also that this value is calibratable and may vary according to vehicle make and model.

Once the CELO phase 302 has terminated, the automatic mode determination phase 304 may initiate. In this phase, it is presumed that the HVAC system 202 is set to a desired comfort level, either automatically or by vehicle 200 occupant action. In the automatic mode determination phase 304, a mode determination process 314 is implemented to determine whether an EWAFS airflow adder 312 should be implemented. At step 316, the controller 228/processors 230 determine whether a user-initiated input 310 is detected such as use of control panel 240 to actuate the windshield wiper system 222, to actuate the heated windshield mode as described above, or to actuate the heated backlight system 224 as an indicator of imminent or actual window fogging. If not, at step 318 the controller 228/processors 230 determine whether the ambient temperature is at or below a threshold temperature (in one non-limiting example 5° C.) by way of inputs from the ambient temperature sensor 236. If not, at step 320 the HVAC system 202 is placed in floor mode.

If the controller 228/processors 230 determine that a user-initiated input 310 has been received, at step 322 the HVAC system 202 is placed in a calibratable mode for a predetermined time period, for example 2 minutes until after the controller 228/processors 230 receive an input indicating that the windshield wiper system 222, heated windshield mode, or heated backlight system 224 have been discontinued. The controller 228/processors 230 then return to step 318 to determine whether the ambient temperature is at or below the threshold temperature by way of inputs from the ambient temperature sensor 236. If so, the controller 228/processors 230 then at step 324 determine a risk of window fogging. In one possible embodiment, the determination of risk of window fogging may be made by reference to a lookup table 326 of window fogging probability versus HVAC system 202 mode. Alternatively, the determination could be made according to an active calculation via a suitable algorithm by the controller 228/processors 230.

If a risk of window fogging is determined, the blower 208 is set at a speed/airflow rate 328 comprising a comfort based calculation plus the EWAFS airflow adder 312 as described above. In this manner, vehicle 200 passenger comfort is maintained to the extent possible, while reducing or eliminating a risk of window fogging according to either vehicle occupant manual inputs, determination of environmental conditions, or both.

Figure 4:
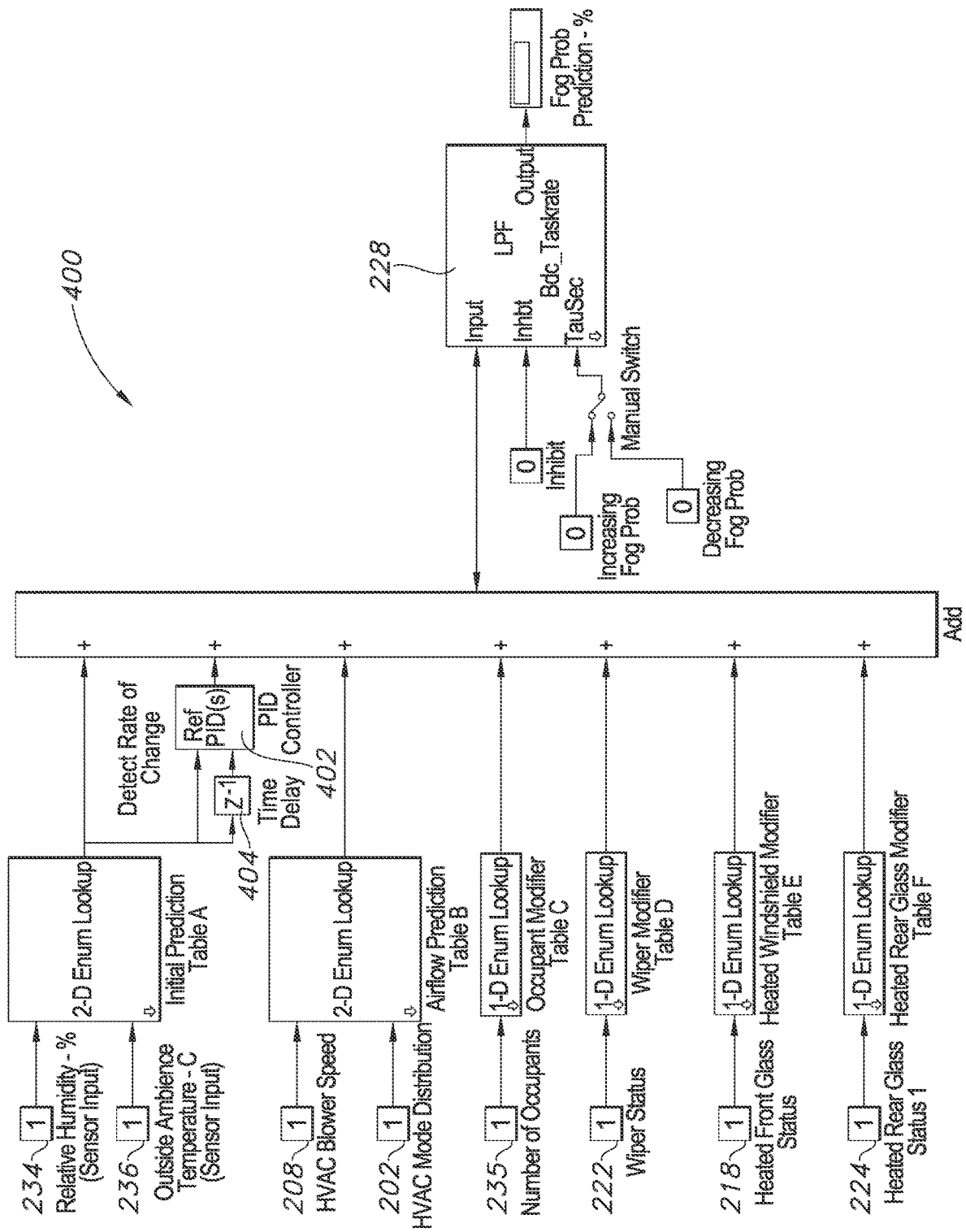
FIG. 4 shows in schematic form a system for determining a probability of window fogging.

Obvious modifications and variations are possible in light of the above teachings. For example, alternative systems/methods for calculating a risk of window fogging to implement of the above-described systems and methods are possible and contemplated. In one such possible alternative embodiment, FIG. 4 shows in schematic form a system 400 for the determination of probability of fog on the interior surface of the windshield 218 or other interior glass. The system 400 relies on inputs from the windshield humidity sensor 234 (measured in %) and the ambient (vehicle-exterior) temperature sensor 236 (see FIG. 2), from which the controller 228 calculates an initial estimate of probability of fogging. The system 400 may optionally provide a calculation of a rate of change of humidity over time to the controller 228, calculated by a proportional-integral-derivative (PID) controller 402 using the inputs from the windshield humidity sensor 234 and the ambient temperature sensor 236 and an internal or other timer 404.

The system 400 then uses various inputs whereby the controller 228 calculates modifiers for the initial estimate of fogging probability. In one possible embodiment, the system 400 may provide inputs indicative of blower 208 motor speed (measured in voltage or %) and HVAC system 202 airflow distribution mode (e.g. Panel mode, Floor mode, etc.), from which the controller 228 calculates an Airflow Modifier for the initial estimate of fogging probability. Inputs from vehicle occupancy sensors 235 (see FIG. 2) may be provided to allow the controller to calculate a vehicle Occupant Modifier. Inputs relative to the windshield wiper system 222 status (on/off/intermittent) may be used by the controller 228 to calculate a Wiper Modifier. Inputs relative to the heated backlight system 224 status (on/off) may be used by the controller 228 to calculate a Heated Rear Glass Modifier. Inputs relative to a heated windshield 218 status (on/off) may be used by the controller 228 to calculate a Heated Windshield Modifier. As will be appreciated, the described Modifiers represent (in percentage form, i.e.

0-100%) a relative contribution of each of the above inputs/ vehicle systems to the overall probability of window fogging.

The controller 228 could of course calculate the above-described fogging probability and Modifiers in real or near-real time according to suitable algorithms. Alternatively, the controller 228 may compare the above-described inputs to one or more stored look-up tables (see FIG. 5), which of course may be stored by the controller 228 or in other suitable storage of another controller. In one possible embodiment, the inputs from the windshield humidity sensor 234 (measured in %) and the ambient temperature sensor 236, and optionally the calculated rate of change of humidity over time, are compared to stored values of a look-up table A to determine an initial probability of fogging. In turn, the blower 208 motor speed/HVAC system 202 airflow distribution mode inputs, the vehicle occupancy sensor 235 inputs, the windshield wiper system 222 status inputs, the heated windshield 218 status inputs, and the heated backlight system 224 status inputs are compared against the same or different stored look-up tables B, C, D, E, and F to determine Modifiers as described above. The Modifiers are combined with the original estimate of fogging probability to refine that original estimate, and to provide a refined fogging probability prediction 406 as a percentage (from 0-100%).

All such modifications and variations are within the scope of the appended claims when interpreted in accordance with the breadth to which they are fairly, legally and equitably entitled.

What is claimed:

1. A method for defogging a window of a vehicle, comprising:
   by a controller according to one or more sensor inputs, automatically selecting a climate control system operating mode according to a predetermined required passenger comfort level from one of an outside air mode, an air-conditioning mode, and a defrost mode;
   determining an imminent risk or actual occurrence of window fogging by the controller or a different controller according to one or more user inputs provided by actuating one or more of a window wiper system, a heated windshield system, and a heated backlight system;
   by the controller or a different controller, increasing a climate control system blower speed to increase an airflow provided by the automatically selected climate control system operating mode based on the determined imminent risk or an actual occurrence of window fogging and directing or redirecting the increased airflow against one or more vehicle windows;
   by the controller or the different controller, redetermining the imminent risk or actual occurrence of window fogging and further transitioning the climate control system operating mode sequentially through the outside mode, the air-conditioning mode, and the defrost mode; and
   providing intervening steps of, by the controller or the different controller according to the redetermined imminent risk or actual occurrence of window fogging, further increasing the climate control system blower speed to increase a rate of airflow and directing or redirecting the airflow against the one or more vehicle windows.

2. The method of claim 1, including actuating an airflow regulating door system to direct or redirect the airflow.

3. The method of claim 1, including providing the one or more sensor inputs to the controller from one or more of a windscreen relative humidity sensor, a vehicle-associated exterior ambient temperature sensor, and a passenger cabin temperature sensor.

4. The method of claim 1, including providing the controller and/or the different controller comprising one or more processors associated with a vehicle climate control module (CCM).

5. A method for defogging a window of a vehicle, comprising:
   during or after a cold engine lock-out phase of operation of a vehicle heating, ventilation, and air-conditioning (HVAC) system, by a processor comprised in a vehicle climate control module (CCM) receiving a first user input provided by actuating one or more of a windshield wiper system, a heated windshield system, and a heated backlight system;
   by the processor or another processor, interpreting the first user input as an indicator of imminent or actual window fogging and increasing an HVAC blower speed to increase airflow and directing or redirecting the airflow against one or more vehicle windows based on the indicator of imminent or actual window fogging;
   during a subsequent automatic HVAC mode determination phase, by the processor or the another processor, receiving one or more sensor inputs and automatically selecting an HVAC operating mode according to a predetermined required passenger comfort level from one of an outside air mode, an air-conditioning mode, and a defrost mode;
   by the processor or the another processor, receiving a second user input provided by actuating one or more of the windshield wiper system, the heated windshield system, and the heated backlight system;
   by the processor or the another processor, interpreting the second user input as an indicator of imminent or actual window fogging and in response increasing the HVAC blower speed to increase airflow provided by the automatically selected HVAC operating mode and directing or redirecting the airflow against the one or more vehicle windows;
   by the processor or the different processor, redetermining the imminent risk or actual occurrence or window fogging and further transitioning the HVAC operating mode sequentially through the outside air mode, the air-conditioning mode, and the defrost mode according to the redetermined risk of window fogging; and
   providing intervening steps of, by the processor of the different processor according to the redetermined imminent risk or actual occurrence of window fogging, further increasing the HVAC blower speed to increase airflow and directing or redirecting the airflow against the one or more vehicle windows.

6. The method of claim 5, including, by the processor or the different processor, actuating an airflow regulating door system to direct or redirect the airflow.

7. The method of claim 5, including providing the one or more sensor inputs to the processor by the group of sensors consisting of a windscreen relative humidity sensor, a vehicle-associated exterior ambient temperature sensor, and a passenger cabin temperature sensor.

* * * * *

UNITED STATES PATENT AND TRADEMARK OFFICE
CERTIFICATE OF CORRECTION

PATENT NO. : 11,897,313 B2
APPLICATION NO. : 17/371853
DATED : February 13, 2024
INVENTOR(S) : Gutowski et al.

Page 1 of 1

It is certified that error appears in the above-identified patent and that said Letters Patent is hereby corrected as shown below:

In the Claims

Column 10:
Claim 5, Line 45 (second occurrence);
"or" should be --of--.
Claim 5, Line 50 (second occurrence);
"of" should be --or--.

Signed and Sealed this
Ninth Day of April, 2024

Katherine Kelly Vidal
*Director of the United States Patent and Trademark Office*